3,558,278
DETERMINATION OF ALBUMIN
Allan Lee Louderback, Temple City, and Nancy Ann Taylor, Canoga Park, Calif., assignors to Baxter Laboratories, Inc., Morton Grove, Ill., a corporation of Delaware
Filed Dec. 26, 1967, Ser. No. 693,418
Int. Cl. G01m 21/22, 31/22, 33/16
U.S. Cl. 23—230                                           8 Claims

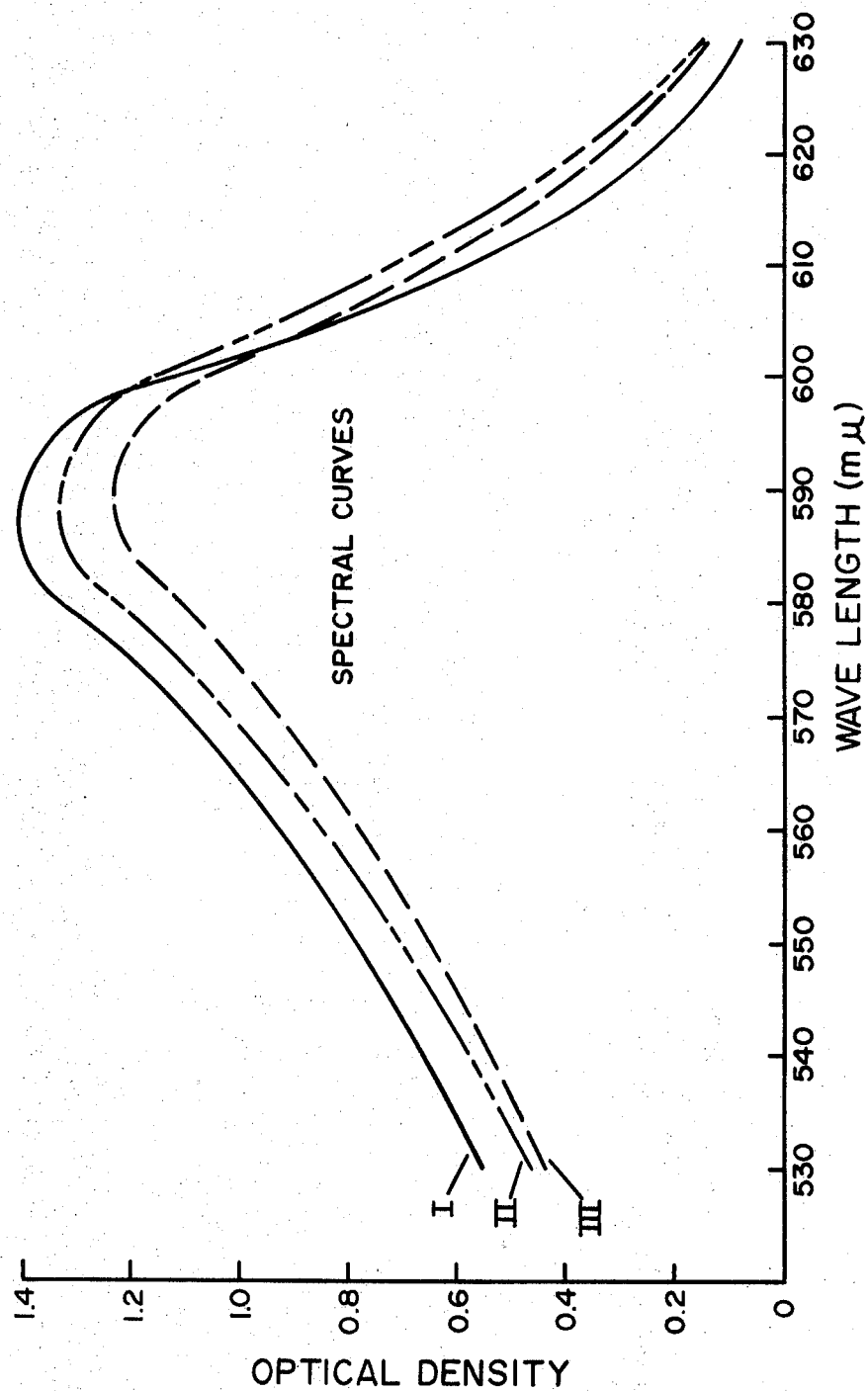

ABSTRACT OF THE DISCLOSURE

A reagent and method for the determination of albumin in liquids employing the addition of brom cresol purple in a buffered solution to an albumin-containing substance and measurement of changes in optical density.

---

The present invention relates to the determination of albumin and, more particularly, to a reagent and method for the determination of albumin in biological fluids and other liquids.

Albumins are naturally occurring simple proteins. Serum albumin, for example, is an important constituent of normal whole blood and helps to regulate the water balance between the blood and tissues. It is known that patients having a deficiency of serum albumin suffer from edema. Consequently, there is a need for a rapid and accurate determination of serum albumin.

Various methods for the determination of albumin in biological fluids and other liquids are known. For example, serum albumin can be salted out of admixture with other substances by use of saturated ammonium sulfate and other conventional protein precipitating agents. Albumin can also be separated from other components by Tiselius electrophoresis. Both of these methods are time-consuming and complicated. The electrophoresis also requires special equipment and highly skilled technic.

Probably the most generally used method of albumin determination involves salting out with sodium sulfite, which requires following a rather complicated procedure. This procedure consists of adding serum to a saturated solution of sodium sulfite in the presence of ether, followed by mixing and centrifuging. The globulin fraction appears as a packed precipitate between the organic and aqueous phases. The aqueous, or lower, phase contains the albumin which must then be analyzed using a procedure for total protein determination such as the biuret method. Wolfson et al., Am. J. Clin. Path., vol. 18, pp. 723–30 (1948).

It is also known that serum albumin is capable of binding with various dyes, which provides other means of determining the presence of albumin in substances. For example, Grollman, J. Biol. Chem., vol 64, pp. 141–60 (1925) discloses that albumin has a useful dye-binding capacity for phenol red. Bracken et al., Am. J. Clin. Path., vol. 23, pp. 1055–58 (1953) disclose the use of methyl orange, and Rutstein et al., J. Clin. Invest., vol. 33, pp. 211–21 (1954) disclose the use of 2-(4'-hydroxybenzeneazo) benzoic acid, as dye-binding agents for albumin determination. Collins, U.S. Pat. 3,063,812, discloses the dye-binding capacity of albumin for brom phenol blue, brom cresol green, and several other dyes. The basis for the use of these various dyes in the determination of albumin is the characteristic acid-to-base color change which occurs at a lower pH value in the presence of albumin than at which the color would change in the absence of albumin. The concentration of albumin in the test sample can be determined by observation of the change in absorbance with photometric, spectrophotometric, and the like equipment and comparing with standard values.

The use of some of these conventionally used dyes for the determination of albumin, for example, brom cresol green, requires employment of very expensive equipment which is capable of accurately measuring relatively high optical densities on the order of 1.0 to 1.8 since it is this range of optical density that is produced in the procedure employing brom cresol green. Rodkey, Clin. Chem., vol. 11, No. 4, pp. 478–87 (1965). Dilution of the brom cresol green dye in attempting to make it useful for optical densities less than 1.0 is not practical since the brom cresol green dye-binding with albumin is not measureable at these dilutions. Therefore, this method is available only to those few laboratories which are equipped with the relatively expensive equipment capable of accurately measuring high optical densities on the order of greater than about 1.0.

Accordingly, it is an object of the present invention to provide a new and improved method and reagent for the determination of albumin.

It is another object of the present invention to provide a rapid method and convenient reagent for the determination of albumin in liquids which are capable of utilizing relatively inexpensive photometric, spectrophotometric, and the like equipment that can accurately measure optical density only in the range of less than about 1.0.

It is another object of this invention to provide a method and reagent for the determination of albumin by a dye-binding technique in which the concentration of albumin in the test sample is in a substantially linear relationship with the optical density.

It is still another object of this invention to provide a method for the determination of albumin which employs a substantially stable reagent.

Other objects and advantages of the present invention will be apparent to those skilled in the art after reading the present specification and the claims appended hereto.

In accordance with the present invention, a method for the analytical determination of albumin is provided which comprises adding to an albumin-containing substance the dye brom cresol purple (5',5''-dibromo-o-cresol sulfonphthalein) in aqueous solution buffered to an alkaline pH higher than the pH of its normal acid-to-base color change and measurement of the optical density of the solution at a wavelength of from about 600 m$\mu$ to about 630 m$\mu$ and preferably at about 615 m$\mu$.

It has been unexpectedly found that the present method provides for accurate measurement of optical density in the range of less than about 1.0 and that the concentration of albumin in the albumin-containing substance is in a substantially linear relationship with the optical density obtained by this method.

Moreover, it has been found that the reagent employing brom cresol purple in aqueous solution buffered to an alkaline pH as hereinbefore described for the determination of albumin exhibits a unique cross-over point in the spectral curve. That is, when the optical density is measured at the wavelength exhibiting the maximum absorption for brom cresol purple, the addition of albumin to the reagent will produce a decrease in optical density. However, as the wavelength used for measuring the optical density is increased, a cross-over point in the spectral curve is reached and at higher wavelengths the addition of albumin to the reagent produces an increase in optical density. At these higher wavelengths, preferably at about 615 m$\mu$, the concentration of albumin in the albumin-containing substance will be directly proportional to the increase in optical density. Thus, fewer calculations are involved in determining the albumin concentration since the instrument used in measuring optical density can be set lent stability of the reagent employing brom cresol purple reagent as the zero point and the concentration of albumin can be read directly as a positive value corresponding to the increase in optical density.

Another advantage of the present invention is the excellent stability of the reagent employinng brom cresol purple in buffered solution compared to reagents of the prior art.

In the preferred method of preparing the reagent used in the present invention, from about 0.2 to about 0.6 part by weight of brom cresol purple are dissolved in 1000 parts by volume of water to form a stock solution of dye. The stock solution is then employed in an aqueous buffer to form the stable reagent of this invention. From about 50 to about 100 parts by volume, and preferably about 75 parts by volume, of the stock solution is added to about 1000 parts by volume of aqueous buffer solution to prepare the stable reagent comprising from about 10 to about 60 parts per million on a weight per volume basis of brom cresol purple in total solution. A preferred buffer is a phosphate buffer having a molarity of from about 0.03 to about 0.06, and preferably about 0.05, and a pH of from about 6.8 to about 7.5, and preferably about 7.0 to about 7.1. These pH ranges are above the normal acid-to-base color change of yellow to purple which occurs between pH 5.2–6.8.

The reagent of this invention can also be prepared by adding the brom cresol purple directly to the aqueous buffer to form a stable reagent having substantially the same concentration of dye and pH of buffer as described above. The concentration of dye in the reagent can also be appropriately adjusted to compensate for the dilution of the albumin-containing substance treated with the reagent.

The reagent of this invention prepared as described herein or by equivalent methods is stable at room temperature (about 25° C.) for periods of time up to about one year.

Other buffers can be employed in place of the phosphate buffer, for example, tris(hydroxymethyl) aminomethane, acetate, citrate, borate and the like buffers having a pH as hereinbefore described.

In the determination of serum albumin, the preferred procedure comprises adding about 4 ml. of the hereinbefore described buffered dye solution and then about 4 ml. of distilled water to about 50 microliters of serum. The test sample is then measured photometrically or spectrophotometrically at from about 600 m$\mu$ to about 630 m$\mu$, and preferably at about 615 m$\mu$, and the optical density is compared with the optical density obtained with standard control samples following the same procedure.

The reagent and method for the determination of albumin and the advantages thereof can be more readily understood by reference to the annexed drawing. In this drawing:

The figure is a graphic illustration of the dye-binding system of this invention in which the optical densities of the known and unknown samples are plotted against the wavelengths to show the spectral curves for the respective samples.

Referring to the figure, it can be seen that the albumin in the unknown sample of human blood serum (curve III) behaves in substantially the same manner as the pure albumin in the known sample of Cohn protein fraction V (curve II) when added to the brom cresol purple reagent buffered to a pH of about 7. The cross-over point at which the optical density or absorbance of the samples containing albumin in the dye reagent becomes greater than that of the dye reagent without albumin (curve I) occurs at about 600 m$\mu$. The optimum vertical distance between the respective curves occurs at about 615 m$\mu$.

The reagent and method of the present invention can be advantageously adapted to spectrophotometric determinations of albumin with instruments such as the Coleman "Autoset," the Coleman Jr. II, and the Beckman B and DB spectrophotometers, which the capable of accurately measuring optical densities only in the range of less than about 1.0. In certain prior art procedures for determining albumin, for example, procedures employing brom cresol green as hereinbefore described, it has been necessary to use the more expensive equipment which is capable of accurately measuring high optical densities in the range of greater than about 1.0, for example, the Beckman DU spectrophotometer with Gilford attachment and the Cary Spectrophotometer.

The reagent and method of the present invention can be used for the determination of albumin in any fluid, for example, biological fluids such as blood serum, urine and the like body fluids, or in various other substances capable of being placed in the liquid state. The determination of albumin in body fluids with the reagent and method of this invention is useful in the diagnosis of various diseases. The dye reagent also can be conveniently prepared in kit form in combination with standard control solutions containing known amounts of albumin for comparison with unknowns.

The following example will further illustrate the invention although the invention is not limited to this specific example. All parts and percentages herein are on a weight basis unless otherwise stated.

EXAMPLE

Brom cresol purple (400 mg.) is dissolved in distilled water (one liter) to form a stock solution of dye. Seventy-five ml. of the stock solution is then added to one liter of phosphate buffer, pH 7.0, consisting of 2.654 grams of potassium phosphate, monobasic, and 4.33 grams of sodium phosphate, dibasic, dissolved in one liter of distilled water.

Standard control solutions containing 3.0 gram percent to 5.0 gram percent of pure albumin (Cohn fraction V) are then compared with an unknown test serum to determine its concentration of albumin as follows:

Fifty microliters of unknown test serum or standard control solution is added to 4 ml. of the above-prepared buffered dye solution. Four ml. of distilled water is then added and mixed into the solution. The solution is measured spectrophotometrically at 615 m$\mu$ on a Coleman "Autoset" spectrophotometer.

The optical densities of the standard control solution containing 4.0 gram percent of albumin and the solution of unknown test serum at various wavelengths are illustratively set forth in the spectral curves II and III, respectively, of the figure of the drawing. An albumin concentration of 3.6 gram percent in the unknown test serum was determined by comparison with the linear curve obtained by plotting the albumin concentrations of the several standard control solutions against their respective optical densities at 615 m$\mu$.

Although the reagent and method of the present invention have been particularly described with reference to use with spectrophotometric instruments capable of accurately measuring optical densities only in the range of less than about 1.0, it will be understood that use of the reagent and method with spectrophotometric instruments capable of accurately measuring high optical densities in the range of greater than 1.0 and with fully automated equipment such as the "AutoAnalyzer" and the "Robot Chemist" as well as in non-automated procedures also is included within the scope of the invention.

As will be readily apparent to those skilled in the art, after reading the foregoing specification and the claims appended hereto, other examples of the herein-defined invention can be devised by various modifications and adaptations without departing from the spirit and scope of the invention. All such modifications and adaptations are included within the scope of this invention as defined in the appended claims.

What is claimed is:

1. A method for the analytical determination of albumin comprising adding to an albumin-containing biological fluid the dye brom cresol purple in aqueous solution buffered to a pH of from about 6.8 to about 7.5 and measurement of the optical density of the solution at a wave length of from about 600 m$\mu$ to about 630 m$\mu$.

2. The method of claim 1 in which the aqueous solution is buffered to a pH of from about 7.0 to about 7.1.

3. The method of claim 1 in which the concentration of the brom cresol purple in the aqueous buffer solution is from about 10 to about 60 parts per million on a weight per volume basis.

4. The method of claim 1 in which the wavelength is about 615 m$\mu$.

5. The method of claim 1 in which the albumin-containing substance is selected from the group consisting of blood serum and urine.

6. The method of claim 1 in which the aqueous solution is buffered to a pH of from about 7.0 to about 7.1 and the concentration of the brom cresol purple in the aqueous solution is from about 10 to about 60 parts per million on a weight per volume basis.

7. A diagnostic reagent for the photometric or spectrophotometric determination of albumin in body fluids comprising from about 10 to about 60 parts per million on a weight per volume basis of brom cresol purple in aqueous solution buffered to a pH of from about 6.8 to about 7.5.

8. The diagnostic reagent of claim 7 in which the aqueous solution is buffered to a pH of from about 7.0 to about 7.1.

References Cited

UNITED STATES PATENTS 3,359,072   12/1957   Rey et al. _____ 23—230

OTHER REFERENCES

E. Fredericq: Chemical Abstracts, vol. 49, pp. 7020–1 (1955).

JOSEPH SCOVRONEK, Primary Examiner

E. A. KATZ, Assistant Examiner

U.S. Cl. X.R.

252—408

UNITED STATES PATENT OFFICE
CERTIFICATE OF CORRECTION

Patent No. 3,558,278                                Dated   January 26, 1971

Inventor(s)  Allan Lee Louderback and Nancy Ann Taylor

It is certified that error appears in the above-identified patent and that said Letters Patent are hereby corrected as shown below:

In the specification, at col. 2, line 71, cancel "lent stability of the reagent employing" and insert --to register the optical density for the--.

Signed and sealed this 1st day of June 1971.

(SEAL)
Attest:

EDWARD M. FLETCHER, JR.                 WILLIAM E. SCHUYLER, JR
Attesting Officer                       Commissioner of Patents